United States Patent [19]

Matsumura

[11] Patent Number: 4,722,873
[45] Date of Patent: Feb. 2, 1988

[54] FUEL CELL POWER GENERATING SYSTEM

[75] Inventor: Mitsuie Matsumura, Amagasaki, Japan

[73] Assignee: Mitsubishi Denki Kabushiki Kaisha, Japan

[21] Appl. No.: 938,615

[22] Filed: Dec. 5, 1986

[30] Foreign Application Priority Data

Dec. 6, 1985 [JP] Japan .................................. 60-275569
Feb. 7, 1986 [JP] Japan .................................. 61-26127

[51] Int. Cl.$^4$ .............................................. H01M 8/06
[52] U.S. Cl. ........................................ 429/24; 429/26; 429/16; 429/17
[58] Field of Search ........................ 429/24, 26, 16, 17, 429/19, 20, 12

[56] References Cited

U.S. PATENT DOCUMENTS

| | | | |
|---|---|---|---|
| 3,455,743 | 7/1969 | Huebscher et al. | 429/24 |
| 4,080,487 | 3/1978 | Reiser | 429/26 X |
| 4,530,886 | 7/1985 | Sederquist | 429/13 |
| 4,650,728 | 3/1987 | Matsumura et al. | 429/26 X |

FOREIGN PATENT DOCUMENTS 61-42874 3/1986 Japan .

OTHER PUBLICATIONS

"Internal Reforming for Natural Gas Fueled Molten Carbonate Fuel Cells", Baker et al, Energy Research Corporation.

*Primary Examiner*—Anthony Skapars
*Attorney, Agent, or Firm*—Leydig, Voit & Mayer

[57] ABSTRACT

A fuel cell power generating system is disclosed in which fuel cells are able to operate with satisfactory and stable cell characteristics for a long period of time even at a high fuel utilization ratio, and which has a high power generating efficiency and a long lifetime. The fuel cell power generating system includes a first fuel cell adapted to be supplied with a fuel gas containing water vapor and an oxidant gas which are subjected to electrochemical and/or chemical reactions for generating electric power, and a second fuel cell adapted to be supplied with the exhaust gas from the first fuel cell and an oxidant gas which are subjected to electrochemical and/or chemical reactions for generating electric power. The humidity of the exhaust gas fed from the first fuel cell to the second fuel cell is appropriately regulated in a manner such that the exhaust gas containing therein an appropriate amount of water vapor is fed to the second fuel cell so as to prevent carbon deposition in the second fuel cell. To this end, a surplus amount of water vapor is removed from the exhaust gas from the first fuel cell.

26 Claims, 6 Drawing Figures

FUEL CELL POWER GENERATING SYSTEM

BACKGROUND OF THE INVENTION

1. Field of the Invention

This invention relates to a fuel cell power generating system and more particularly to a fuel cell power generating system in which the power generating efficiency is improved.

2. Description of the Prior Art

FIG. 1 is a diagrammatic illustration showing a prior art power generating system using a molten carbonate fuel cell which is disclosed, for example, in GRI Report No. FCR-3522-2 (1981), entitled "Evaluation of Natural Gas Molten Carbonate Power Plant". In FIG. 1, the power generating system illustrated includes a molten carbonate fuel cell 1 composed of singular or plural cell stacks and having a fuel gas electrode and an oxidant gas electrode, a temperature and humidity regulating means 2 for regulating the temperature and the humidity of the fuel gas exhausted from the molten carbonate fuel cell 1, a combustor 3 for oxidizing the unreacted components in the fuel gas exhausted from the molten carbonate fuel cell 1, a heat exchanger 4 for carrying out the excess heat, which is generated in the molten carbonate fuel cell 1, to the exterior of the system, and a gas circulation means for circulating a part of the exhaust gas discharged from the fuel cell 1 as a heat transfer medium for cooling the fuel cell 1.

In a fuel processing device such as a reforming device, a coal gasification device or the like, the fuel gas, obtained by reforming hydrocarbons, alcohols, coals or the like, contains, as its principal components, hydrogen, carbon monoxide and carbon dioxide. In order to avoid deposition of the carbon owing to the decomposition of the carbon monoxide under a high temperature condition (for example, over 400° C.), as shown in the following formula (1), the fuel gas, being added by an appropriate amount of water vapor, is supplied to the fuel gas electrode of the molten carbonate fuel cell 1.

$$2CO \rightleftharpoons C \downarrow + CO_2 \qquad (1)$$

The water vapor contained in the fuel gas would consume the carbon monoxide according to the formula (2), so that the deposition of the carbon can be prevented.

$$CO + H_2 \rightleftharpoons CO_2 + H_2O \qquad (2)$$

Excess moisture in the fuel gas exhausted from the fuel gas electrode of the molten carbonate fuel cell 1 is removed as drain by the temperature and humidity regulating means 2. After adjustment of the temperature and moisture of the fuel gas, unreacted combustible materials contained therein are oxidized throughly by the combustor 3, and then supplied to the oxidant gas electrode of the molten carbonate fuel cell 1. On the other hand, air, supplied from air supplying means (not shown) such as a blower, is mixed with the fully oxidized combustion gas supplied from the combustor 3, and then fed to the oxidant gas electrode of the molten carbonate fuel cell 1 as an oxidant gas.

The molten carbonate fuel cell 1 operates at around 650° C., and the following electrochemical and chemical reactions (3) and (4) will occur at the fuel gas electrode and the oxidant gas electrode, respectively, of the fuel cell 1. (at the fuel gas electrode)

$$H_2 + CO_3^{2-} \rightleftharpoons H_2O + CO_2 + 2e^- \qquad (3)$$

$$CO + H_2O \rightleftharpoons CO_2 + H_2 \qquad (4)$$

(at the oxidant gas electrode)

$$\tfrac{1}{2} O_2 + CO_2 + 2e^- \rightleftharpoons CO_3^{2-} \qquad (5)$$

As a result of these reactions, the molten carbonate fuel cell 1 converts the chemical energy of the fuel gas to electrical energy and heat energy. The heat energy thus produced is removed from the molten carbonate fuel cell 1 by the circulating oxidant gas which is circulated as a heat transfer medium through the oxidant gas electrode and the heat exchanger 4 by the gas circulation means 5. The removed heat is transmitted to the heat exchanger 4 and is discharged therefrom to the exterior of the system.

The power generating efficiency of the fuel cell system is influenced by various factors. Among them, important factors are a fuel utilization ratio and an average single cell voltage. These two factors are mutually correlated so that when the fuel utilizing ratio is too much increased, the average single cell voltage will be decreased considerably because of dilution of the reactant materials such as hydrogen or carbon monoxide at the outlet of the fuel cell 1. This tendency appears significantly in the molten carbonate type fuel cell in which the reaction products, for example, water vapor or carbon dioxide, are diffused to the fuel gas side, as shown in formula (3). FIG. 2 shows one example of the correlation between the fuel utilization ratio and the average single cell voltage in the molten carbonate fuel cell 1.

In the fuel cell power generating system, the most effective measure for improving the power generating efficiency is to increase the fuel utilization ratio. In the prior art power generating system, however, if the fuel utilization ratio increases, the average single cell voltage decreases extremely. Accordingly, effective improvement in the power generating efficiency has not been accomplished.

On the other hand, when the fuel utilization ratio increases, the partial pressure of the water vapor contained in the fuel gas increases at the outlet of the fuel cell. This results in the problems that the corrosion of various metallic members are accelerated and the decomposition of the electrolyte is promoted as shown in the formula (6), particularly in the case of the molten carbonate fuel cell. Therefore, the lifetime of the fuel cell will be shortened.

$$LiKCO_3 + H_2O \rightleftharpoons LiK(OH)_2 + CO_2 \qquad (6)$$

Another type of a prior art power generating system is known which is diagrammatically illustrated in FIG. 3. This power generating system includes, in addition to the same components 1 through 5 as those shown in FIG. 1, a second molten carbonate fuel cell 6 composed of singular or plural cell stacks and having a fuel gas electrode and an oxidant gas electrode, the second fuel cell 6 being disposed between the first molten carbonate fuel cell 1 and the temperature and humidity regulating means 2; and a temperature adjusting means 7 which is interposed between the first and second molten carbonate fuel cells 1 and 6 for adjusting the temperature of the fuel gas fed from a fresh fuel gas and a fresh water vapor, which are the same as those fed to the fuel gas electrode of the first fuel cell 1 and are admixed with the exhaust fuel gas discharged from the first fuel cell 1. The fuel gas exhausted from the electrode of the second fuel cell 6 is fed to the temperature and humidity regulating means 2, and the oxidant gas electrodes and of the first and second fuel cells 1 and 6 are supplied with the fully oxidized gas from the combustor and air. Also, a part of exhaust gases discharged from the oxidant gas electrodes and of the first and second fuel cells 1 and 6 is circulated through the heat exhanger 4 and the oxidant gas electrodes and by means of the gas circulation means 5.

The above-described fuel cell power generating system illustrated in FIG. 3 operates substantially in the same manner as the first-mentioned system shown in FIG. 1 does, except for the following. Specifically, the fuel gas or exhaust gas, exhausted from the fuel gas electrode side of the first molten carbonate fuel cell 1 and containing unreacted combustible components and water vapor, is admixed with a fresh fuel gas and a fresh water vapor, of which compositions are the same as those In the second molten carbonate fuel cell 6, the same reactions as those in the first molten carbonate fuel cell 1 take place for generating electric power while preventing carbon deposition. The fuel gas exhausted from the second molten carbonate fuel cell 6 is introduced to the temperature and humidity regulating device 2 wherein the surplus water vapor in the exhaust gas is condensed and removed, and the temperature and the humidity of the fuel gas are appropriately adjusted. Then, the unreacted combustible materials in the exhaust gas discharged from the fuel gas electrode side of the second fuel cell 6 are completely oxidized by air in the combustor 3 and supplied to the first and second molten carbonate fuel cells 1 and 6. The heat taken out by the heat exchanger 4 from the exhaust gas discharged from the oxidant gas electrodes of the first and second fuel cells 1 and 6 is used, for example, for producing water vapor so as to run a steam turbine for generation of electric power as a bottoming cycle. Also, water vapor to be mixed with the fuel gas can be produced by utilizing the taken-out heat.

With the second-mentioned fuel cell power generating system, however, a large quantity of water vapor must be added to the fuel gas for the purpose of avoiding carbon deposition so that the amount of water vapor, utilizable for the bottoming cycle, for example, is necessarily reduced. Accordingly, the power generating efficiency of this system as a whole is low.

SUMMARY OF THE INVENTION

Accordingly, an object of the present invention is to provide a fuel cell power generating system in which fuel cells are able to operate with satisfactory and stable cell characteristics for a long period of time even at a high fuel utilization ratio, and which has a high power generating efficiency and a long lifetime.

In order to achieve the above object, according to one aspect of the present invention, there is provided a fuel cell power generating system comprising:

a first fuel cell adapted to be supplied with a fuel gas containing water vapor and an oxidant gas which are subjected to electrochemical and/or chemical reactions for generating electric power;

a second fuel cell adapted to be supplied with the exhaust gas from the first fuel cell and an oxidant gas which are subjected to electrochemical and/or chemical reactions for generating electric power; and a humidity regulating means for appropriately regulating the humidity of the exhaust gas fed from the first fuel cell to the second fuel cell in a manner such that the exhaust gas containing therein an appropriate amount of water vapor is fed to the second fuel cell so as to prevent carbon deposition in the second fuel cell.

According to another aspect of the present invention, there is provided a fuel cell power generating system comprising:

a first fuel cell adapted to be supplied with a fuel gas containing water vapor and an oxidant gas which are subjected to electrochemical and/or chemical reactions for generating electric power;

a second fuel cell adapted to be supplied with the exhaust gas containing water vapor from the first fuel cell, a fresh fuel gas, a fresh water vapor, and oxidant gas which are subjected to electrochemical and/or chemical reactions for generating electric power;

a sensor means for detecting the amount of the water vapor contained in the exhaust gas fed from the first fuel cell to the second fuel cell; and a water vapor adjusting means for adjusting, on the basis of the amount of the water vapor in the exhaust gas from the first fuel cell detected by the sensor means, the amount of fresh water vapor to be admixed with the exhaust gas from the first fuel cell such that a minimum amount of water vapor is present in the second fuel cell so as to prevent carbon deposition therein.

An embodiment in accordance with the present invention may feature a temperature adjusting means for adjusting the temperature of the exhaust gas fed from the first fuel cell to the second fuel cell.

BRIEF DESCRIPTION OF THE DRAWINGS

The present invention will become more readily apparent from the following detailed description of a few preferred embodiments of the invention when taken in conjunction with the accompanying drawings, in which.

DESCRIPTION OF THE PREFERRED EMBODIMENTS

Figure 1:
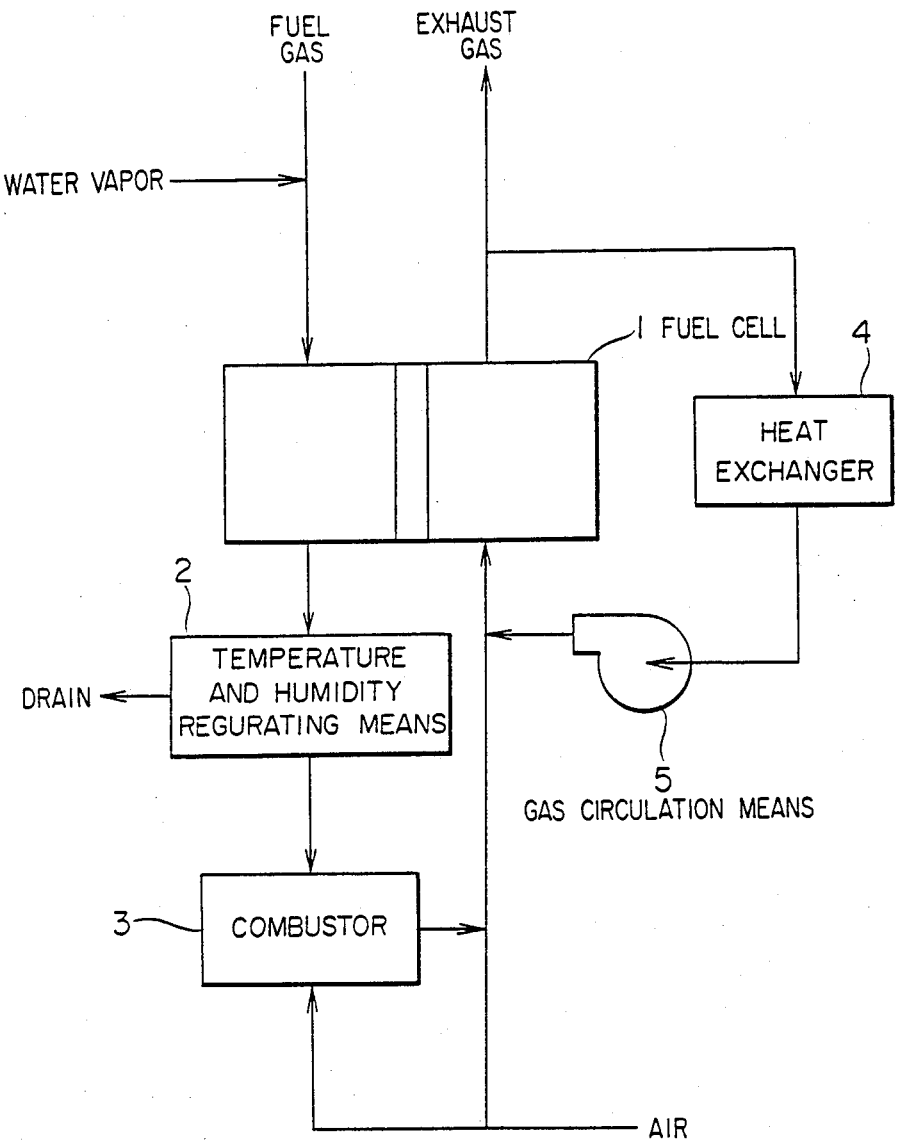
FIG. 1 is a diagrammatic illustration showing a prior art power generating system using a molten carbonate fuel cell.
Figure 2:
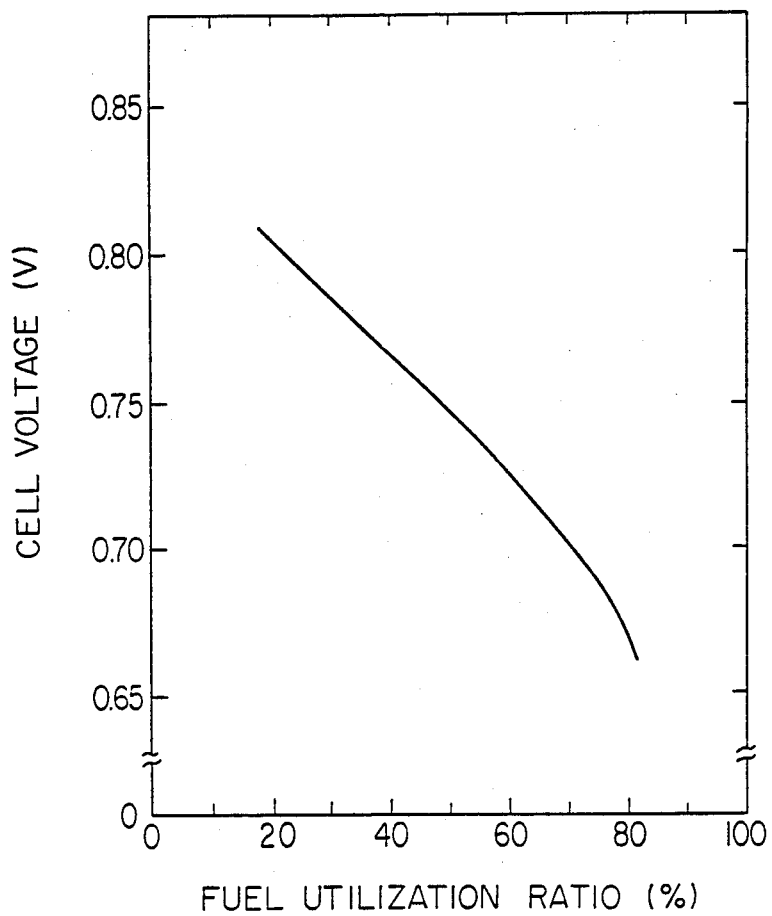
FIG. 2 is a graphic representation showing a correlation between the fuel utilizing ratio and the average single cell voltage in the moten carbonate fuel cell in FIG. 1.

The present invention will now be described in detail with reference to a few presently preferred embodiments illustrated in the accompanying drawings. In the following, the same or corresponding parts of the embodiments are identified by the same reference numerals as employed in FIGS. 1 and 3.

Figure 3:
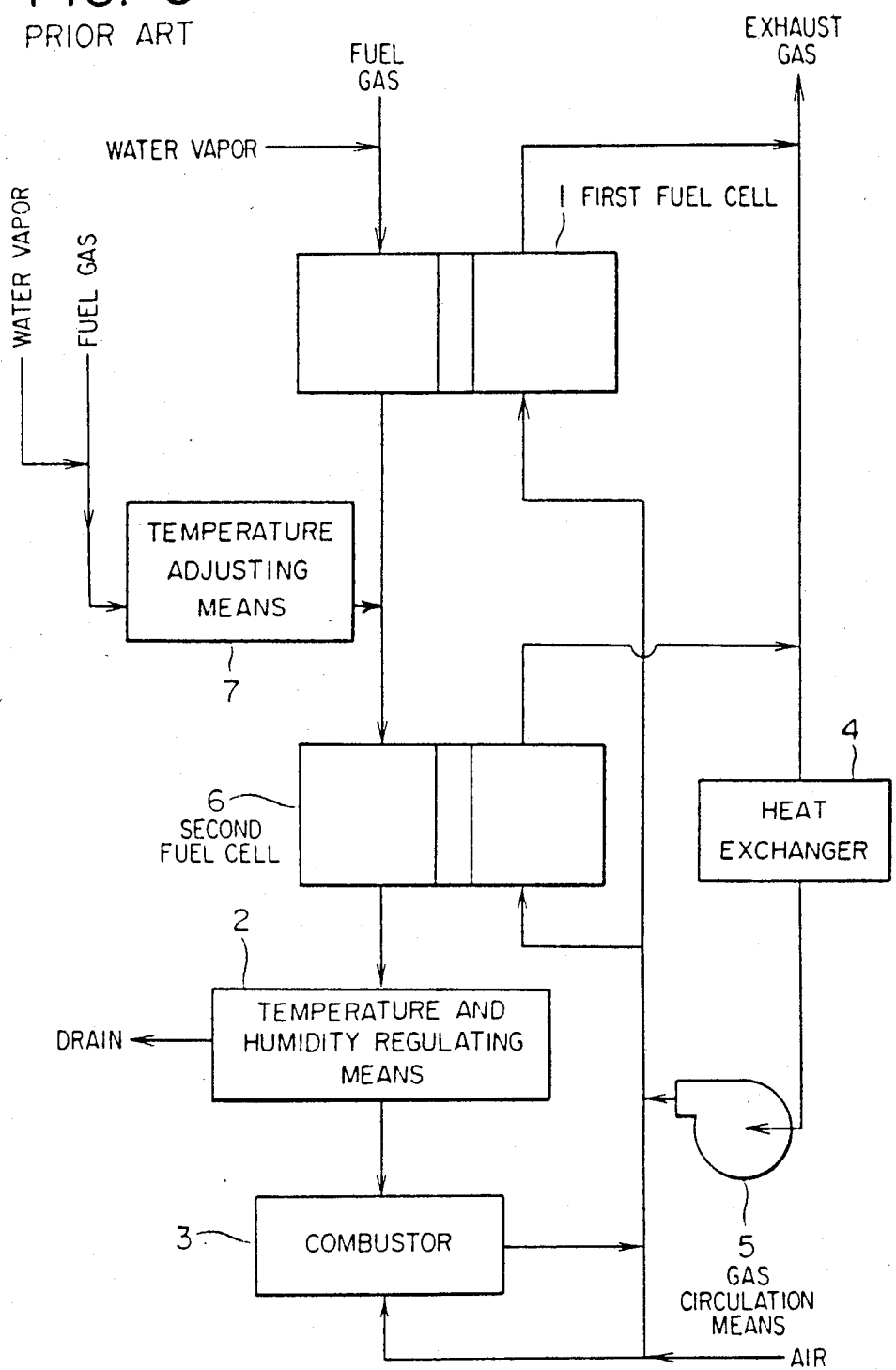
FIG. 3 is a view similar to FIG. 1 showing another prior art power generating sytem having two molten carbonate fuel cells.
Figure 4:
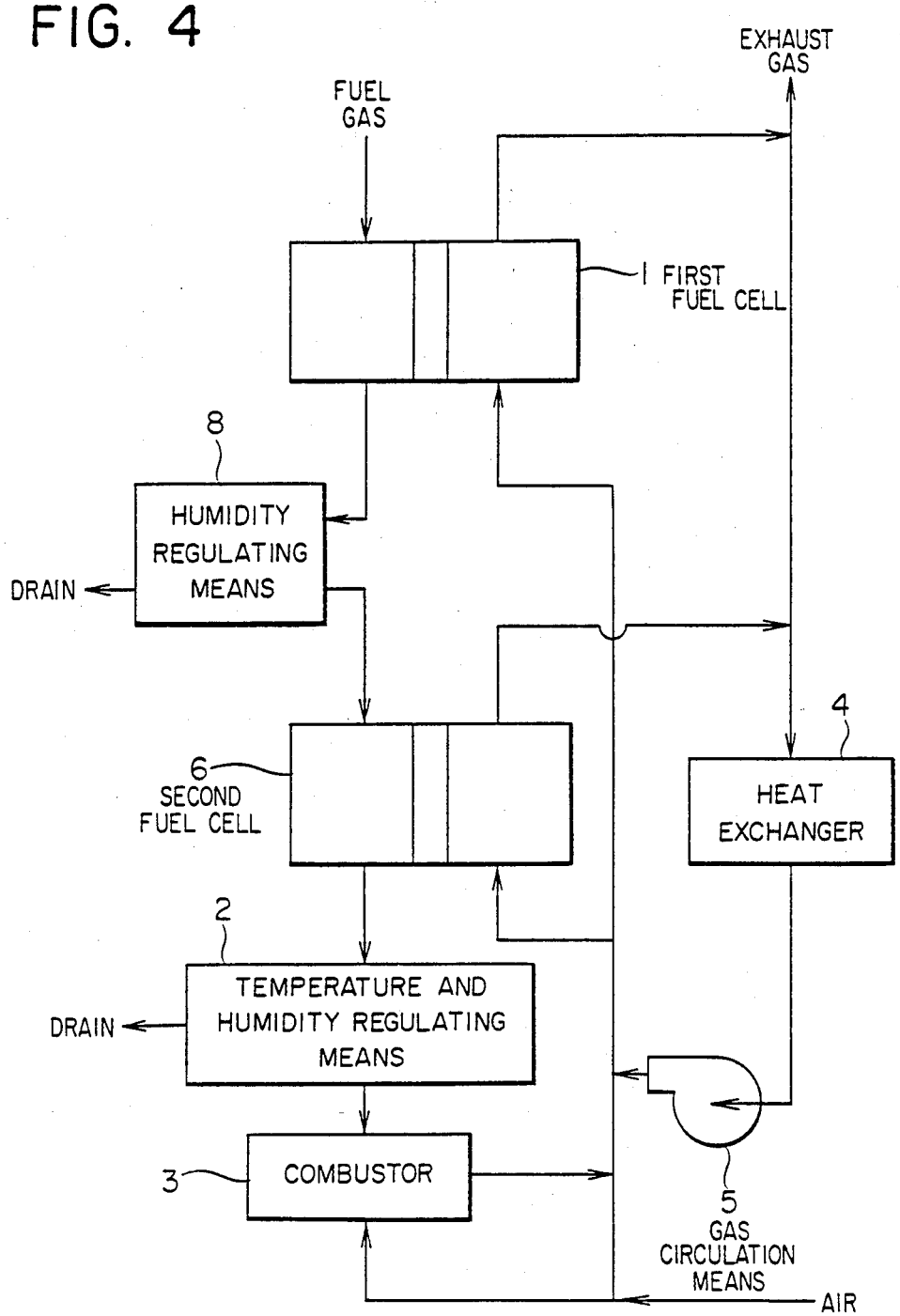
FIG. 4 is a diagrammatic illustration showing a fuel cell power generating system in accordance with one embodiment of the present invention.

Referring to the drawings and first to FIG. 4, there is illustrated a fuel cell power generating system in accordance with one embodiment of the present invention. Similar to the prior art fuel cell power generating system as illustrated in FIG. 3, the system of the present invention illustrated in FIG. 4 includes a first or upstream-side molten carbonate fuel cell 1, a temperature and humidity regulating means 2, a combustor 3, a heat exchanger 4, a gas circulation means 5 and a second or downstream-side molten carbonate fuel cell 6, these components being the same as those shown in FIG. 3. In addition to the above components, the system of the invention includes, in place of the temperature regulating means 7 of the aforementioned prior art illustrated in FIG. 3, a humidity regulating means 8 for regulating the humidity of the fuel gas or exhaust gas fed from the first fuel cell 1 to the second fuel cell 6.

According to this embodiment, an excessive amount of fuel gas containing water vapor is supplied to the first molten carbonate fuel cell 1 so that a part of the fuel gas supplied to the first molten carbonate fuel cell 1 is also consumed in the second molten carbonate fuel cell 6. The exhaust gas from the first fuel cell 1, containing, in addition to reacted and unreacted fuel gas components, a large quantity of water vapor produced by an electrochemical reaction, as expressed by the aforementioned formula (3), is supplied to the humidity regulating means 8 wherein the humidity of the exhaust gas is regulated by removing a proper amount of water vapor. In this regard, since removal of an exessive amount of water vapor will result in a deposition of the carbon through the aforementioned reactions (1) and (2), it is important to regulate the humidity of the exhaust gas by taking account of the possibility of carbon deposition in the second fuel cell 6. The humidity regulating means 8 is readily constructed, for example, by a first heat exchanger for condensing a part of the water vapor by cooling the exhaust gas, a steam separator for separating the condensed water, and a second heat exchanger for preheating the cooled exhaust gas. The removal of the water vapor can be carried out by using, for example, an absorbent such as a molecular sieve.

The exhaust gas thus appropriately regulated in its humidity is supplied from the humidity regulating means 8 to the second molten carbonate fuel cell 6. Since the excess water vapor in the exhaust gas is removed in the humidity regulating means 8, the partial pressures of the hydrogen and the carbon monoxide, which are reactants, relatively increase so that the average single cell voltage of the second molten carbonate fuel cell 6 can be improved. In considering the entire system, important is the total system value of the average single cell voltage which is obtained by averaging both of the average single cell voltages of the first and second molten carbonate fuel cells 1 and 6 weighted with the respective chemical reaction amounts thereof. According to the present invention, the average single cell voltage of the total system is increased as a result of the improvement in the average single cell voltage of the second molten carbonate fuel cell 6. Accordingly, the power generating efficiency of the system is improved.

In this connection, it it is to be noted that such an improvement in the power generating efficiency is remarkable particularly in the operating condition of the system at a high fuel utilization ratio, in which the partial pressure of the water vapor produced by the electrochemical reaction (3) is high.

In a molten carbonate fuel cell power generating system which utilizes the fuel gas obtained by steam reforming natural gas by means of a reforming reactor, the composition of the fuel gas is assumed to be the following:

$CH_4$—1.0%
$H_2$—48.3%
$CO$—9.5%
$CO_2$—4.9%
$H_2O$—36.3%

With the above fuel gas composition, when the first fuel cell 1 and the second fuel cell 6 operate at a total utilizing ratio of 90%, at an operating pressure of 6.0 $Kg/cm^2G$ (gauge pressure), and at a ratio (1:1) of the electrochemical reaction amount of the first fuel cell 1 to that of the second fuel cell 6, the mole fractions of the water vapor can be decreased from about 48% to about 25% by the humidity regulating means 8. The partial pressure of saturated water vapor at this time corresponds to a saturated water vapor pressure at about 116° C. Accordingly, in order to decrease the mole fractions of the water vapor to about 25% by cooling the exhaust gas from the first fuel cell 1 to condense a part of the water vapor contained therein in the humidity regulating means 8, it is necessary to cool the exhaust gas to about 116° C., for example, by means of a heat exhanger so that a part of the water vapor contained in the exhaust gas is condensed for removal. In the above example, it was found that the power generating efficiency was improved by 2% to 3% as compared with the prior art.

Moreover, in the second or downstream molten carbonate fuel cell 6, the concentration of the water vapor in the exhaust gas can be decreased, thereby materially reducing corrosion of the metallic members of the system and decomposition of the electrolytes. As a result, the useful life of the fuel cell power generating system can be increased.

Figure 5:
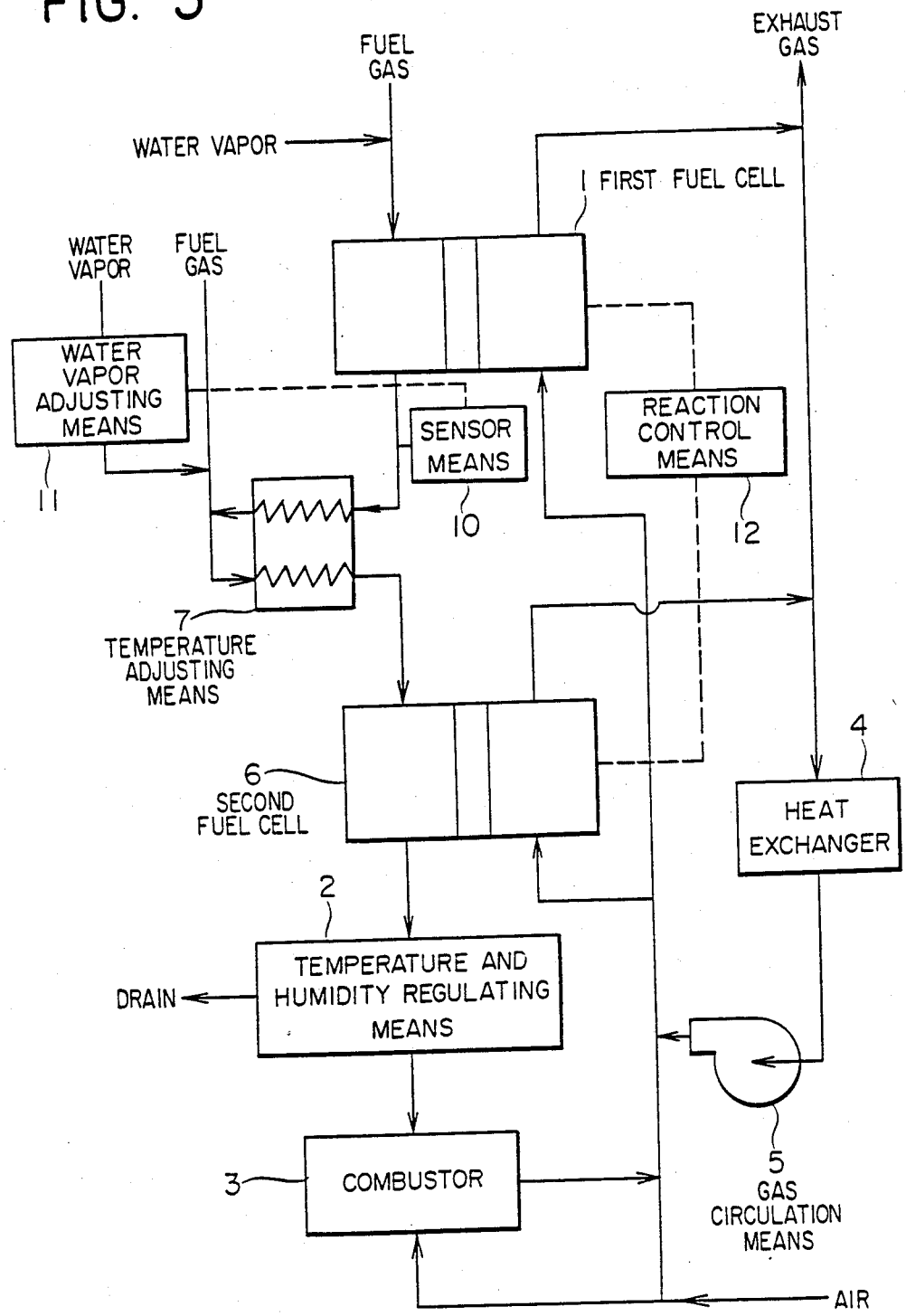
FIG. 5 is a view similar to FIG. 4, but showing a fuel cell power generating system in accordance with another embodiment of the present invention.

FIG. 5 shows a fuel cell power generating system in accordance with another embodiment of the present invention. This embodiment is similar to the prior art fuel power generating system of FIG. 3 except for the following. Specifically, the fuel cell power generating system of this embodiment includes, in addition to the same components 1 through 7 as those in FIG. 3, a sensor means 10 for detecting the amount of fuel gas or exhaust gas exhausted from the first fuel cell 1 as well as the amount of water vapor contained therein; a water vapor adjusting means 11 for adjusting the amount of a water vapor to be admixed to the exhaust gas from the first fuel cell 1 on the basis of the amount of the water vapor contained in the exhaust gas from the first fuel cell 1 detected by the sensor means 10; and a reaction control means 12 for controlling the amount of reactions carried out in the first and second molten carbonate fuel cells 1 and 6.

In this regard, the amounts of fuel gas and water vapor fed to the first fuel cell 1 are set to be greater than those consumed in the first fuel cell 1 so that parts of the fuel gas and the water vapor fed to the first fuel cell 1 can be used in the second fuel cell 6.

On the other hand, the fuel gas or exhaust gas exhausted from the first fuel cell 1 contains a large quantity of water vapor, produced according to the aforementioned reaction (3), so that the required amount of fresh water vapor to be supplied to the second fuel cell 6 can be accordingly reduced. In an extreme case, by appropriately adjusting the ratio of the reaction amount in the second fuel cell 6 to that in the first fuel cell 1 by means of the reaction control means 12 in a manner such that an amount of water vapor sufficient to surpress carbon deposition can be produced, it becomes possible to omit supply of fresh water vapor to the second fuel cell 6.

Accordingly, for the entire fuel generating system, the amount of fresh water vapor to be added to the exhaust gas from the first fuel cell 1 for preventing carbon deposition in the second fuel cell 6 can be reduced remarkably, and hence the heat required for producing the total amount of water vapor to be fed to the first and second fuel cells 1 and 6 can also be decreased. For example, in the fuel cell power generating system in which the water vapor, produced by the heat taken out by the heat exchanger 4, is utilized to provide a bottoming cycle for power generation so that the amount of water vapor utilizable for power generation is increased, thereby substantially improving the power generating efficiency of the system as a whole.

Now, it is considered that the molten carbonate fuel cells 1 and 6 operate using coal gasification gas as a fuel gas and oxygen as an oxidant gas. In this case, when the fuel gas composition is 36% $H_2$, 62% CO and 2% $CO_2$, it becomes possible to omit supply of fresh vapor to the second fuel cell 6 by setting the ratio of the amount of the chemical reaction (3) in the first fuel cell 1 to the amount of the chemical reaction (3) in the second fuel cell 6 to be 2:3. In addition, the amount of water vapor required by the entire system can be reduced to about 40% as compared with the prior art fuel cell power generating system of FIG. 3. In this regard, the saved amount of water vapor corresponds to an improvement of 2% to 3% in the power generating efficiency.

It should be noted that a minimum amount M of the water vapor for preventing the carbon deposition in the second fuel cell 6 is obtained as follows. First, the compositions and amounts of the fresh fuel gas and the exhaust gas including all water vapor (a fresh water vapor and the water vapor produced in the first fuel cell 1) being supplied to the second fuel cell 6 are determined at the time when all the fuel gas and the water vapor fed to the second fuel cell 6 undergo the aforementioned chemical reaction (2) and an equilibrium of this reaction is established, and then a range of the water vapor amount to be present in the second fuel cell 6 is calculated which can prevent the fuel gas and the water vapor of such compositions or amounts from causing carbon deposition as expressed by the aforementioned reaction (1). From such a range, the minimum amount M of the water vapor able to prevent carbon deposition is determined. Therefore, in order to prevent carbon deposition, the water vapor adjusting means 11 serves to supply the fresh water vapor to the exhaust gas from the first fuel cell 1 at an appropriate amount which is equal to or slightly greater than a difference between the above minimum amount M and the amount of water vapor contained in the exhaust gas detected by the sensor means 10.

Figure 6:
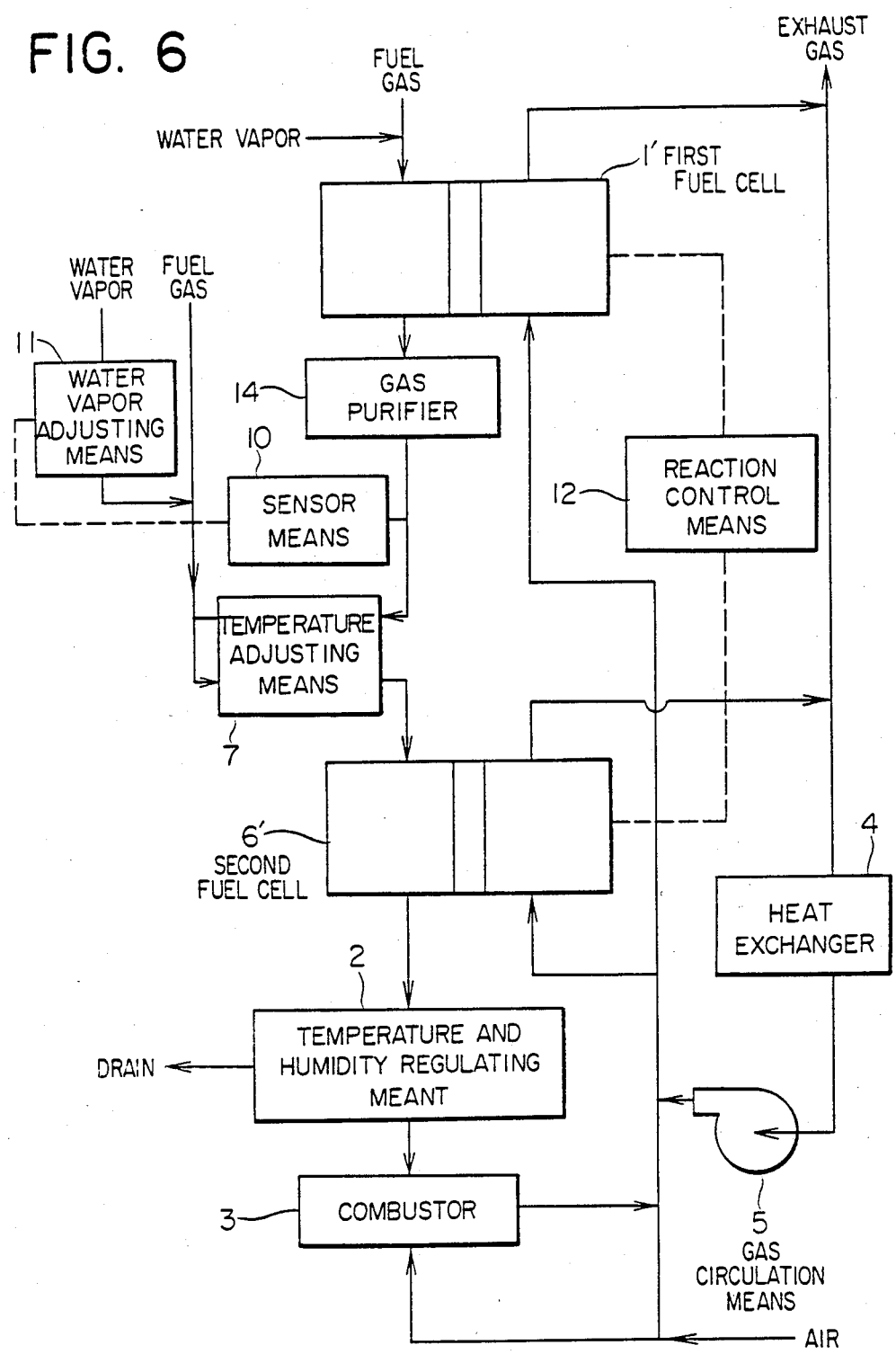
FIG. 6 is a view similar to FIG. 4, but showing a fuel cell power generating system in accordance with a further embodiment of the present invention.

FIG. 6 diagrammatically shows a fuel cell power generating system in accordance with a further embodiment of the present invention. In this embodiment, the power generating system employs a first fuel cell 1' and a second fuel cell 6' each in the form of an internally reforming type molten carbonate fuel cell, and a gas purifier 14 interposed between the first fuel cell 1' and the second fuel cell 6' for removing impurities from the exhaust fuel gas and the water vapor fed from the first fuel cell 1' to the second fuel cell 6'. The system of this embodiment further includes components 2 to 7 and 10 to 12 which are the same as those employed in the above embodiment shown in FIG. 5.

The internally reforming type molten carbonate fuel cells 1' and 6' serve to perform, in parallel or addition to the electrochemical and chemical reactions (3) through (5), reforming reactions in which $H_2$ and CO are produced from lower hydrocarbons such as methane or alcohols. Accordingly, supplied to these internally reforming type molten carbonate fuel cells 1' and 6' are a fuel gas containing, as its major components, lower hydrocarbons such as methane or alcohols, and water vapor which acts to accelerate reforming reactions as well as to prevent the deposition of carbon from the fuel gas. From the point of view of improving the power generating efficiency, it is desirable to reduce the amount of water vapor supply as much as possible, but there is a lower limit for the water vapor in order to prevent carbon deposition. For example, in cases where methane is used for the fuel gas, it is necessary to supply water vapor in the amount of at least 1.5-2.0 mol per mol of methane.

Consequently, the required amount of fresh water vapor to be supplied to the second internally reforming type molten carbonate fuel cell 6' can be reduced by supplying the water vapor, produced in the first fuel cell 1' according to the reaction (3), to the second fuel cell 6'.

The exhaust gas and the water vapor exhausted from the first internally reforming type molten carbonate fuel cell 1' contain impurities such as electrolyte vapor, powdered corrosion products or the like which are particularly harmful to the reforming catalysts in the second internally reforming type molten carbonate fuel cell 6'. Therefore, it is desirable that such impurities are not fed to the second fuel cell 6'. To this end, provision is made for the gas purifier 14 in which the exhaust gas is contacted with materials such as, for example, silica, alumina or the like highly reactive with the electrolyte vapor at high temperatures, thereby removing the electrolyte vapor. Otherwise, the exhaust gas may be cooled to condense the electrolyte vapor which, together with other powdered impurities, is then removed therefrom by means of a filter.

The arrangement and operation of this embodiment other than the above are identical to those of the above mentioned second embodiment illustrated in FIG. 5, and thus further detailed description thereof is omitted.

Although in the above-described embodiments, the fuel cell power generating system utilizes the molten carbonate fuel cells, other types of fuel cells such as solid electrolyte fuel cells, which operate at temperatures at which carbon deposition in the fuel gas takes place, can be employed.

In the embodiments illustrated in FIGS. 5 and 6, in order to prevent carbon deposition, the exhaust gas containing water vapor exhausted from the first fuel cell is mixed with the fresh fuel gas and the fresh water vapor from the outside by virtue of the temperature regulating means. More particularly, the exhaust gas from the first molten carbonate fuel cell 1 is first cooled to a temperature of, for example, 200° C., at which there is no possibility of carbon depostion, and then admixed with the fresh fuel gas and the fresh water vapor. Thereafter, the mixture thus produced is preheated and supplied to the second molten carbonate fuel cell 6. In this manner, the exhaust gas from the first fuel cell 1 can be effectively mixed with the fresh fuel gas while preventing carbon depostion. However, in place of the temperature regulating means, there may be provided a mixing means having a nozzle and a baffle plate for mixing the exhaust gas from the first fuel cell with a fresh fuel gas, the nozzle and the baffle plate being appropriately shaped or positioned such that the exhaust gas and the fresh gas can be well mixed with each other in a swift manner so as to avoid carbon deposition.

Further, in the above-described embodiments, the temperature regulating means 3, the temperature and humidity regulating means 4, the combustor 5, the heat exchanger 6 and the gas circulation means 5 are not indispensable but any of them may be omitted as necessary.

Moreover, although in the embodiments described above, the first cell stack or stacks forming the first fuel cell 1 and the second cell stack or stacks forming the second fuel cell 6 are independent and separated from each other, the first and second cell stacks may be assembled into a single unit. In this case, the same advantages will be provided.

In addition, in the above embodiments, two (first and second) fuel cells are used, but one or more further fuel cells can be employed. In this case, the exhaust gas discharged from a first fuel cell is supplied to a second fuel cell through a humidity regulating means, and the exhaust gas discharged from the second fuel cell in turn is supplied to a third fuel cell through another humidity regulating means. In this case, the same advantages as those in the above-mentioned embodiments will be obtained. Also, it will be apparent that the path for feeding the oxidant gas to the fuel cells is not limited to that shown in the above-described embodiments.

While a few presently preferred embodiments of the present invention have been shown and described herein, it will be apparent to those skilled in the art that various changes and/or modifications thereof can be made without departing from the spirit and scope of the invention as defined in the appended claims.

What is claimed is:

1. A fuel cell power generating system comprising:
   a first fuel cell adapted to be supplied with a fuel gas containing water vapor and an oxidant gas which are subjected to electrochemical and/or chemical reactions for generating electric power;
   a second fuel cell adapted to be supplied with the exhaust gas from said first fuel cell and an oxidant gas which are subjected to electrochemical and/or chemical reactions for generating electric power; and
   a humidity regulating means for appropriately regulating the humidity of the exhaust gas fed from said first fuel cell to said second fuel cell in a manner such that the exhaust gas containing an appropriate amount of water vapor is fed to said second fuel cell so as to prevent carbon deposition in said second fuel cell.

2. A fuel cell power generating system as set forth in claim 1 wherein the fuel gas to be supplied to said first fuel cell comprises, as its principal components, hydrogen, carbon monoxide, and carbon dioxide.

3. A fuel cell power generating system as set forth in claim 2 wherein the fuel gas to be supplied to said first fuel cell further comprises hydrocarbons.

4. A fuel cell power generating system as set forth in claim 1 wherein the fuel gas supplied to said first fuel cell contains an excessive amount of water vapor greater than that necessary to prevent carbon deposition in said first fuel cell, said humidity regulating means being adapted to remove an appropriate amount of the water vapor contained in the exhaust gas discharged from said first fuel cell so as to prevent carbon deposition in said second fuel cell.

5. A fuel cell power generating system as set forth in claim 1 wherein said first fuel cell comprises a molten carbonate type fuel cell.

6. A fuel cell power generating system as set forth in claim 1 wherein said first fuel cell comprises a solid electrolyte type fuel cell.

7. A fuel cell power generating system as set forth in claim 1 wherein said first and second fuel cells comprise first and second cell stacks, respectively, which are formed into a single laminated unit.

8. A fuel cell power generating system as set forth in claim 1 further comprising a combustor adapted to be fed with the exhaust gas from said second fuel cell and air so as to fully oxidize unreacted combustible materials contained therein for feeding the fully oxidized combustion materials to said first and second fuel cells.

9. A fuel cell power generating system as set forth in claim 8 further comprising a temperature and humidity regulating means for regulating the temperature and the humidity of the exhaust gas fed from said second fuel cell to said combustor.

10. A fuel cell power generating system as set forth in claim 9 further comprising:
    a heat exchanger; and
    a gas circulation means for circulating a part of the exhaust gas, discharged from said first and second fuel cells to the outside of the system, through said heat exchanger for effective utilization of heat energy.

11. A fuel cell power generating system comprising:
    a first fuel cell adapted to be supplied with a fuel gas containing water vapor and an oxidant gas which are subjected to electrochemical and/or chemical reactions for generating electric power;
    a second fuel cell adapted to be supplied with the exhaust gas containing water vapor from said first fuel cell, a fresh fuel gas, a fresh water vapor, and an oxidant gas which are subjected to electrochemical and/or chemical reactions for generating electric power;
    a sensor means for detecting the amount of the water vapor contained in the exhaust gas fed from said first fuel cell to said second fuel cell; and
    a water vapor adjusting means for adjusting, on the basis of the amount of the water vapor in the exhaust gas from said first fuel cell detected by said sensor means, the amount of fresh water vapor to be admixed with the exhaust gas from said first fuel cell such that a minimum amount of water vapor is present in said second fuel cell so as to prevent carbon deposition therein.

12. A fuel cell power generating system as set forth in claim 11 further comprising a reaction control means for controlling the ratio of the amount of reactions carried out in said first fuel cell to that in said second fuel cell.

13. A fuel cell power generating system as set forth in claim 11 wherein said temperature adjusting means comprises heat exchanger means adapted to cool the exhaust gas containing water vapor from said first fuel cell for admixing the fresh fuel gas and the fresh water vapor to the thus cooled exhaust gas, said heat exchanger further preheating the mixture of the fresh fuel gas, the fresh water vapor and the cooled exhaust gas before it is fed to said second fuel cell.

14. A fuel cell power generating system as set forth in claim 13 wherein said heat exchanger comprises a self heat-exchanging type heat exchanger.

15. A fuel cell power generating system as set forth in claim 11 wherein each of said first and second fuel cells comprises a molten carbonate type fuel cell.

16. A fuel cell power generating system as set forth in claim 15 wherein each of said first and second fuel cells comprises an internally-reforming type molten carbonate fuel cell.

17. A fuel cell power generating system as set forth in claim 16 further comprising a gas purifier adapted to remove impurities contained in the exhaust gas fed from said first fuel cell to said second fuel cell.

18. A fuel cell power generating system as set forth in claim 11 wherein each of said first and second fuel cells comprises a solid electrolyte type fuel cell.

19. A fuel cell power generating system as set forth in claim 11 wherein said first and second fuel cells comprise first and second cell stacks, respectively, which are formed separately from each other.

20. A fuel cell power generating system as set forth in claim 11 wherein said first and second fuel cells comprise first and second cell stacks, respectively, which are formed into a single laminated unit.

21. A fuel cell power generating system as set forth in claim 11 further comprising a combustor adapted to be fed with the exhaust gas from said second fuel cell and air so as to fully oxidize unreacted combustible materials contained therein for feeding the fully oxidized combustion materials to said first and second fuel cells.

22. A fuel cell power generating system as set forth in claim 21 further comprising a temperature and humidity regulating means for regulating the temperature and the humidity of the exhaust gas fed from said second fuel cell to said combustor.

23. A fuel cell power generating system as set forth in claim 22 further comprising:
a heat exchanger; and
a gas circulation means for circulating a part of the exhaust gas, discharged from said first and second fuel cells to the outside of the system, through said heat exchanger for effective utilization of heat energy.

24. A fuel cell power generating system comprising:
an upstream-side fuel cell adapted to be supplied with a fuel gas and an oxidant gas for generating electric power through electrochemical and/or chemical reactions thereof;
a downstream-side fuel cell adapted to be supplied with the exhaust gas from said upstream-side fuel cell and an oxidant gas for generating electric power through electrochemical and/or chemical reactions thereof; and
a humidity regulating means for appropriately reducing the humidity of the exhaust gas fed from said first fuel cell to said second fuel cell so as to prevent carbon deposition in said second fuel cell.

25. A fuel cell power generating system comprising:
a first fuel cell adapted to be supplied with a first fuel gas containing first carbon components and an excessive amount of water vapor greater than a first minimum amount of water vapor able to prevent carbon deposition of said first carbon components, and a first oxidant gas for generating electric power through electrochemical and/or chemical reactions thereof; and
a second fuel cell adapted to be supplied with the exhaust gas containing water vapor from said first fuel cell, a second fuel gas containing second carbon components, a second water vapor in an amount which is less than a second minimum amount of water vapor able to prevent carbon deposition of said second carbon components and greater than a difference between the second minimum water vapor amount and the amount of water vapor contained in the exhaust gas from said first fuel cell, and a second oxidant gas for generating electric power through electrochemical and/or chemical reactions thereof.

26. A fuel cell power generating system as set forth in claim 11 further comprising a temperature adjusting means for adjusting the temperature of the exhaust gas fed from said first fuel cell to said second fuel cell.

* * * * *